United States Patent
Schumacher et al.

(10) Patent No.: US 9,185,841 B2
(45) Date of Patent: Nov. 17, 2015

(54) SOWING HEART MONITORING APPARATUS, SOWING HEART AND SINGLE-SEED DRILL

(75) Inventors: Ferdinand Schumacher, Lippetal-Oestinghausen (DE); Werner Krybus, Bad Sassendorf (DE)

(73) Assignees: Kverneland AS, Kverneland (NO); Fachhochschule Sudwestfalen, Iserlohn (DE)

( * ) Notice: Subject to any disclaimer, the term of this patent is extended or adjusted under 35 U.S.C. 154(b) by 79 days.

(21) Appl. No.: 14/007,348

(22) PCT Filed: Feb. 6, 2012

(86) PCT No.: PCT/EP2012/051967
§ 371 (c)(1),
(2), (4) Date: Sep. 25, 2013

(87) PCT Pub. No.: WO2012/139784
PCT Pub. Date: Oct. 18, 2012

(65) Prior Publication Data
US 2014/0014012 A1  Jan. 16, 2014

(30) Foreign Application Priority Data
Apr. 11, 2011  (DE) .......................... 10 2011 001 949

(51) Int. Cl.
*A01C 7/04* (2006.01)
*A01C 7/10* (2006.01)
*G01M 13/00* (2006.01)

(52) U.S. Cl.
CPC ................. *A01C 7/105* (2013.01); *A01C 7/046* (2013.01); *G01M 13/00* (2013.01)

(58) Field of Classification Search
CPC ........ A01C 7/105; A01C 7/046; A01C 7/044; A01C 7/042; A01C 7/04; A01C 7/00; A01C 7/102; A01C 7/10; A01C 7/08; G01M 13/00
See application file for complete search history.

(56) References Cited

U.S. PATENT DOCUMENTS

| 2,183,606 A | 12/1939 | Day ............................... 209/111 |
| 7,717,048 B2 | 5/2010 | Peterson, Jr. et al. ......... 111/185 |

(Continued)

FOREIGN PATENT DOCUMENTS

| DE | 699 25 582 | 4/2006 | ............. G01B 11/24 |
| DE | 10 2007 048 941 | 4/2009 | ............... A01C 7/10 |

(Continued)

OTHER PUBLICATIONS

International Search Report for International Application No. PCT/EP2012/051967, May 14, 2012.

*Primary Examiner* — Christopher J Novosad
(74) *Attorney, Agent, or Firm* — Kusner & Jaffe (57) ABSTRACT

A sowing heart monitoring apparatus for connection to a sowing heart and for monitoring of the sowing heart with a line camera with one detection direction, a housing which can be attached to the sowing heart for accommodating the line camera and a radiation source for generating electromagnetic waves which can be detected by the line camera with one radiation direction. The sowing heart monitoring apparatus is made such that electromagnetic waves which have been generated by the radiation source can be detected by the line camera after reflection on one reflection surface of a rotating sowing disc of the sowing heart and can be evaluated by an evaluation unit. The invention also relates to a sowing heart and a single-seed drill.

17 Claims, 7 Drawing Sheets

(56) References Cited

U.S. PATENT DOCUMENTS

| | | | |
|---|---|---|---|
| 2007/0266917 A1 | 11/2007 | Riewerts et al. | 111/200 |
| 2011/0046776 A1 | 2/2011 | Goldman et al. | 700/225 |

FOREIGN PATENT DOCUMENTS

| | | | |
|---|---|---|---|
| EP | 1 882 405 A2 | 1/2008 | A01C 7/10 |
| EP | 2 044 828 | 4/2009 | A01C 7/10 |
| WO | WO 2005/096798 | 10/2005 | A01C 7/00 |
| WO | WO 2005/096799 | 10/2005 | A01C 7/00 |

SOWING HEART MONITORING APPARATUS, SOWING HEART AND SINGLE-SEED DRILL

FIELD OF THE INVENTION

The invention relates to a sowing heart monitoring apparatus, a sowing heart, and a single-seed drill.

BACKGROUND OF THE INVENTION

Monitoring apparatus for monitoring the operation of single-seed drills are known in different versions. Often the monitoring is carried out on a conveying channel due to easy accessibility, as for example in document WO 2005/096799 A1 or WO 2005/096798 A1.

Monitoring apparatus are used among others for control and adjustment as well as checking of the proper operation of the sowing sets. There is a requirement that the monitoring responds quickly and works easily and without problems. Furthermore the monitoring apparatus should work as economically and maintenance-free as possible.

SUMMARY OF THE INVENTION

The object of this invention is therefore to devise a monitoring apparatus with which promptly responding, reliable monitoring which can be economically produced for sowing sets of single-seed drills is enabled.

This object is achieved with the features of the independent claim(s).

Advantageous developments of the invention are given in the dependent claims. All combinations of at least two of the features given in the specification, the claims and/or the figures also fall within the scope of the invention.

The basic idea of this invention is to make a monitoring apparatus able to be integrated into a sowing heart so that the monitoring of the seed delivery is carried out directly on the element which is responsible for the separation, specifically the sowing heart. Another aspect of this invention is therefore to provide the monitoring in an economical, promptly responsive and space-saving manner by a line camera, especially by pure contrast measurement. It is especially advantageous in this invention that the monitoring can take place only from one side of the sowing disc, specifically especially by reflection measurement. In other words: electromagnetic waves directed from a radiation source onto the sowing disc are reflected by the sowing disk and after reflection are detected by the line camera, specifically in the region in which the seed is conveyed on the sowing disc. The line camera is accordingly focused on the reflection surface of the sowing disc and the pulses which have been generated by the line camera are evaluated by an evaluation unit, distinctly different pulses being obtained on the sowing holes, depending on whether no seed grain, one seed grain or two seed grains adhere on the sowing hole. Thus the occupancy of each sowing hole can be directly evaluated after detection, therefore inline.

According to one especially advantageous embodiment of the invention it is provided that the detection direction and the radiation direction can be arranged at the same angle to the reflection surface, especially dictated by fasteners of the housing on the sowing heart and the arrangement of the line camera and the radiation source in the housing. In this way reproducible exposure of the line camera to the electromagnetic waves which are delivered by the radiation source and which are reflected on the reflection surface takes place.

By the housing being made tight relative to the environment, especially by its being sealable onto the sowing heart, the line camera (and also the radiation source) are effectively protected against dust and/or moisture and/or scattered light. Thus long and consistent operation can be ensured. According to one development of this invention, it is provided that between the line camera and the reflection surface there is a disk which transmits the electromagnetic waves, especially for sealing of the housing relative to the environment. The light refraction which occurs on the disk can be minimized during passage of the electromagnetic waves and can also be included in the evaluation. Here it is especially advantageous if the disc consists of a material with an index of refraction <1.6, especially <1.5 ($\lambda$=589 nm), preferably of polymethyl methacrylate (plexiglass). The advantage of polymethyl methacrylate is its elastic properties and induced impact strength as well as its good thermal properties. The good transmission property relative to light is especially advantageous. Alternatively, polycarbonate is conceivable as the material.

By the line camera being made to detect occupancy of the sowing holes of the rotating sowing disc by seed grains, very good conclusions regarding the correct setting of the sowing heart can be drawn. The setting is dependent especially on the different seeds, but also on the ambient conditions.

This invention can be implemented especially economically and effectively when the radiation source is a light source, in particular an LED, preferably a red LED. The use of a colored LED is especially advantageous because in particular the outside light distance can be optimized in combination with a corresponding filter.

According to another advantageous embodiment of the invention, between the reflection surface and the line camera, especially on the line camera, there is a filter which is selective for electromagnetic waves. Thus the effects of outside light can be further reduced.

An independent invention is a sowing heart for a single-seed drill with a sowing disc which can be rotated in one direction of rotation R with a plurality of sowing holes which are distributed concentrically to the sowing disc, for adherence of individual seed grains, especially by negative pressure, along at least one concentric sowing hole circle, and with a sowing heart monitoring apparatus described above. By the sowing heart monitoring apparatus being attached on one peripheral edge of the sowing heart, especially on fasteners for fixing of the sowing heart on the single-seed drill, the sowing heart monitoring apparatus can be easily and economically integrated in a space-saving manner. The sowing heart need only be mechanically altered to a minor extent, specifically in one component region of half of the sowing heart.

Other advantages, features and details of the invention will become apparent from the following description of preferred exemplary embodiments and using the drawings.

BRIEF DESCRIPTION OF THE DRAWINGS

In the figures the same components or components with the same function are identified with the same reference numbers.

DETAILED DESCRIPTION OF THE INVENTION

Figure 1A:
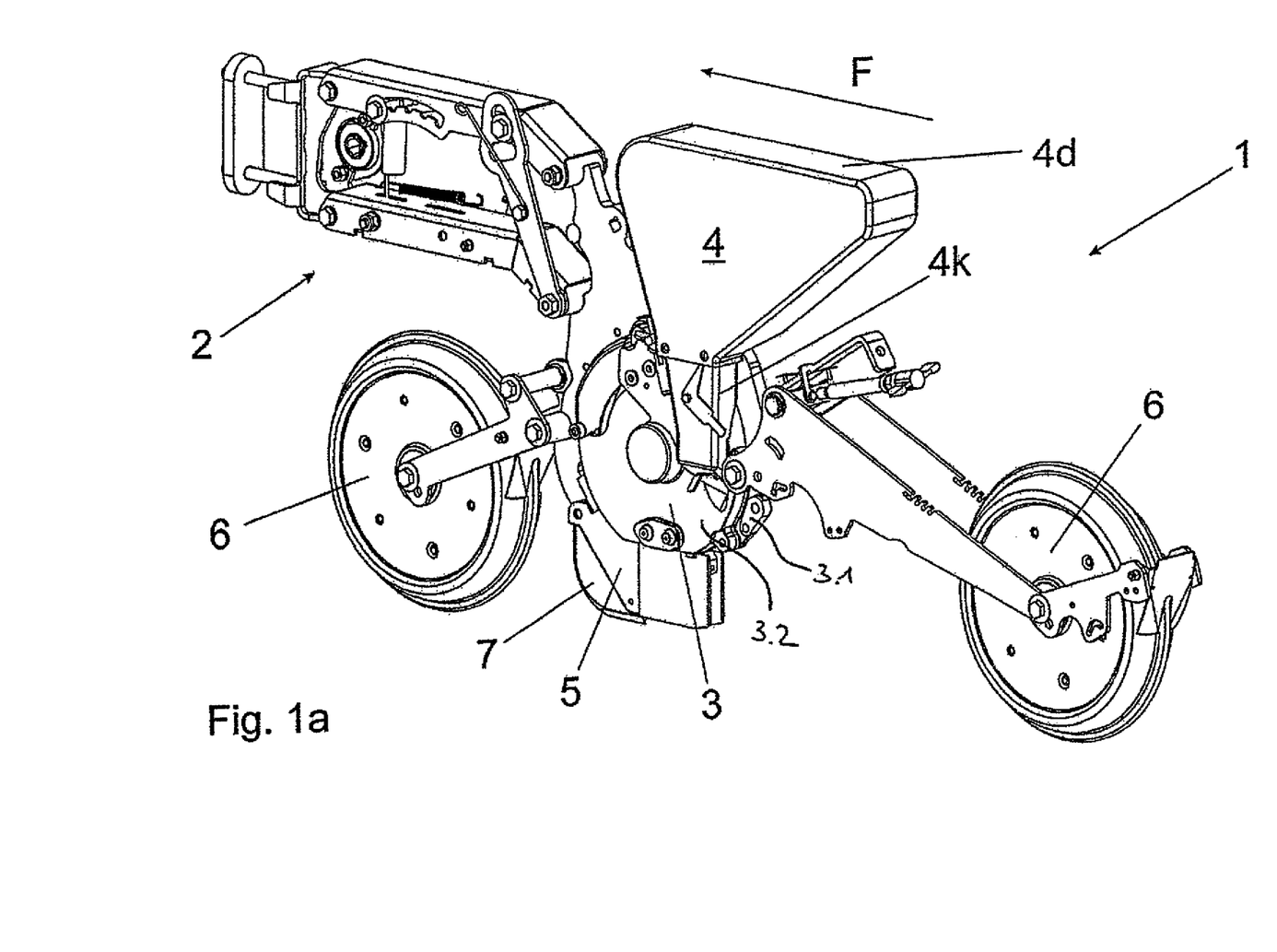
FIGS. 1a and 1b show perspective views of a single-seed sowing set of a generic single-seed drill in the direction of travel from obliquely backward (FIG. 1a) and from obliquely forward (FIG. 1b)
Figure 1B:
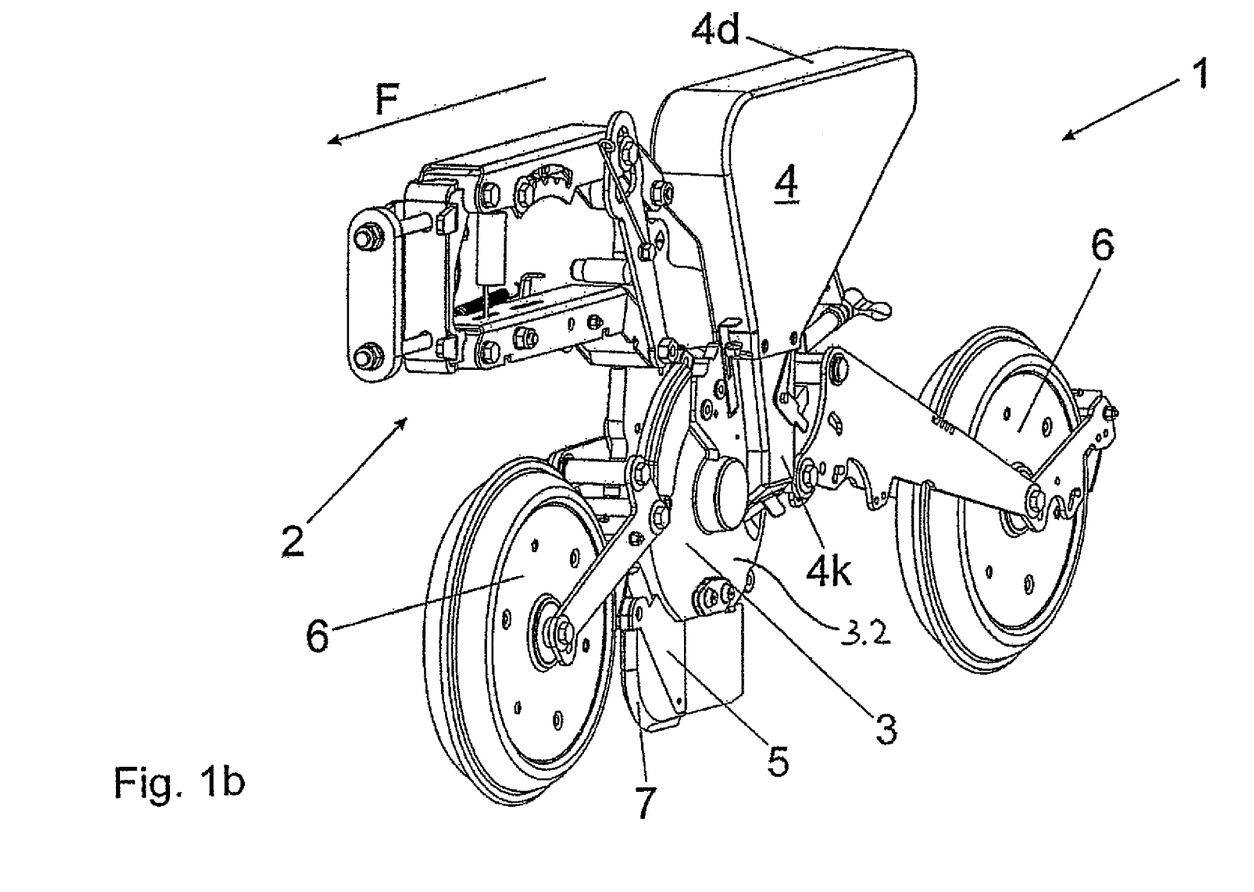

FIGS. 1a and 1b show a sowing set 1 of a single-seed drill which is attached via an arm 2 to the frame of the single-seed drill. Accordingly the direction of travel during operation of the single-seed drill is in the direction indicated by the arrow F.

On the arm 2, which allows a pivoting motion, preferably as a vertical movement, by execution of the arm 2 as a parallelogram, the following are mounted: a sowing heart 3, a tank 4 which is located above the sowing heart 3, a sowing share 5 which is located underneath the sowing heart 3, and two travelling wheels 6 which are located in front of and behind the sowing heart 3 in the direction of travel F and which can be pivoted relative to the sowing heart 3. The tank 4 can be closed by way of a cover 4d and can be filled with seed 16 which in turn is routed via a channel 4k laterally into the sowing heart 3.

The seed 16 is deposited separated in the sowing heart 3 and via the sowing share 5 into a furrow in the soil which has been opened by a point 7 of the sowing share 5.

Figure 2:
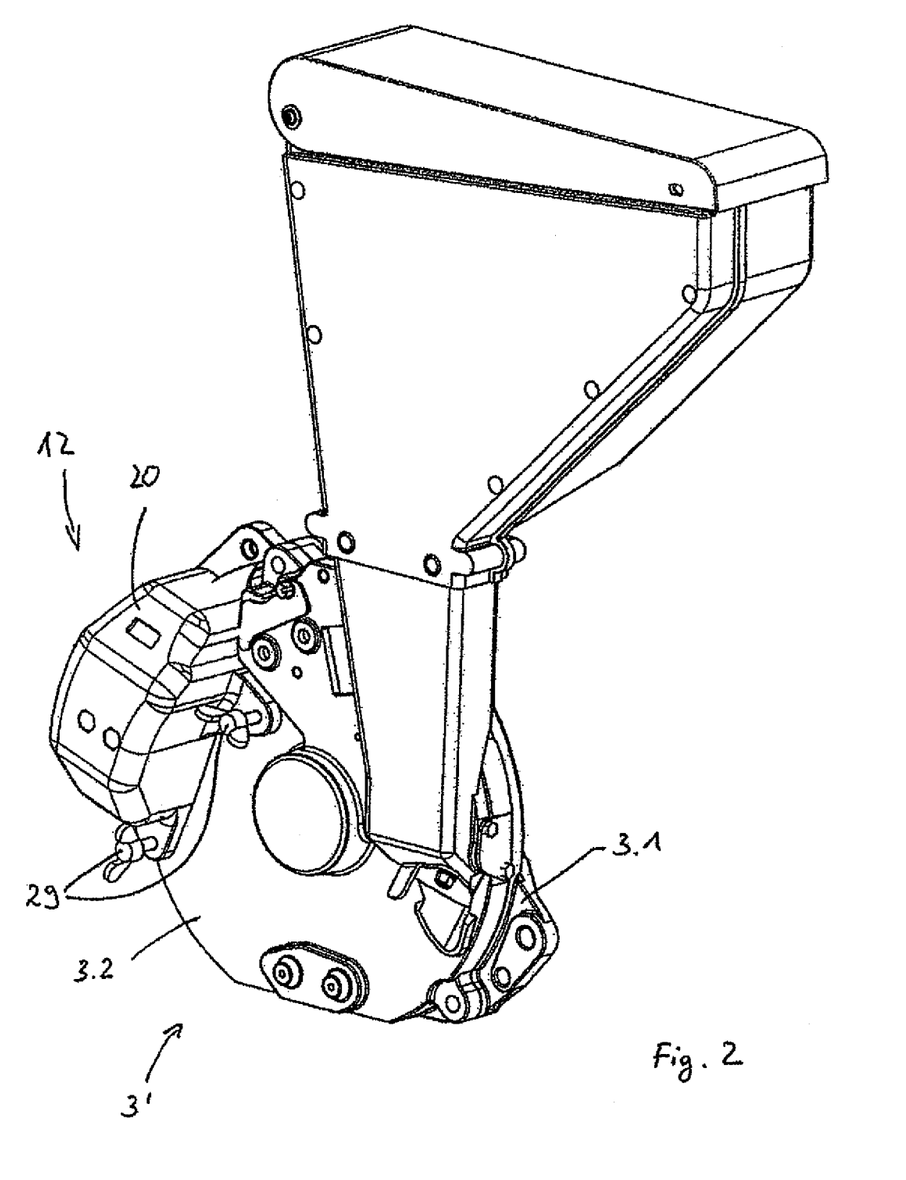
FIG. 2 shows a perspective view of a sowing heart according to an embodiment of the present invention.

FIG. 2 shows a sowing heart 3' which in contrast to the sowing heart 3 as shown in FIGS. 1a and 1b has a sowing heart monitoring apparatus 12 on one region of the sowing heart 3' which lies forward in the direction of travel F. The sowing heart monitoring apparatus 12 is located in particular on the periphery of the sowing heart 3', especially in the region on which the arm 2 is attached to the sowing heart 3'.

Figure 3:
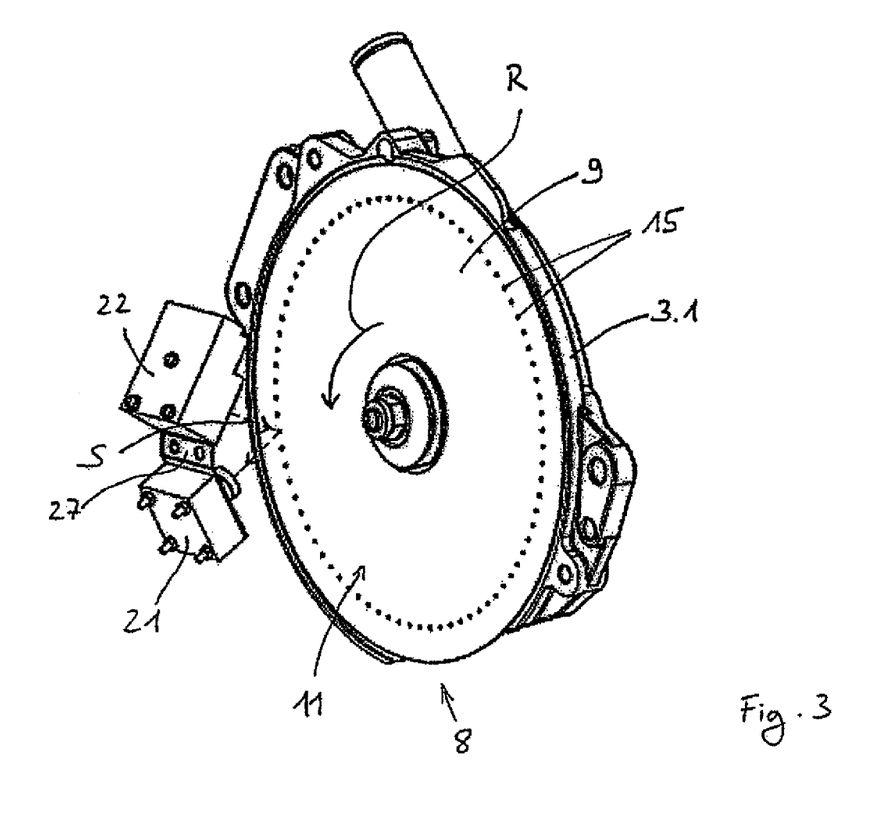
FIG. 3 shows a perspective view of individual parts of the sowing heart as shown in FIG. 2.

The sowing hearts 3, 3' have two halves 3.1 and 3.2, one working space 8 which is surrounded by the two halves 3.1 and 3.2 being divided by a sowing disc 9 into a pressure side 10 and a seed side 11.

On the periphery of the sowing disc 9 sowing holes 15 through which the pressure side 10 and the seed side 11 are connected are distributed (sowing hole circle) concentrically to the circular sowing disc 9.

The sowing holes 15, depending on the seed 16 which is to be separated, have suitable diameters which can be in the range from 0.5 mm to 3 mm.

The sowing disc 9 transports the seed 16 by negative pressure adherence of individual seed grains 16 on the sowing holes 15 by means of rotation of the sowing disk 9 in one direction of rotation R from the receipt to the discharge of each seed 16.

Ideally each sowing hole 15 accommodates an individual seed grain 16; but in practice this does not always work 100%. Depending on the seed used and depending on the setting of the sowing hole 3' and the travelling speed, it happens that a sowing hole 15 does not pick up any seed grain 16 or picks up even two seed grains 16. At the corresponding sowing site in the coil this leads to either no plant growing or two plants growing which cannot be adequately provided with nutrients and therefore remain underdeveloped.

But it is especially critical if individual sowing sets 1 of a single-seed drill fail completely, for example due to a malfunction or high level of fouling.

The sowing heart monitoring apparatus 12 is designed to recognize a malfunction early and moreover optionally to control/adjust each individual sowing heart 3'.

Figure 4:
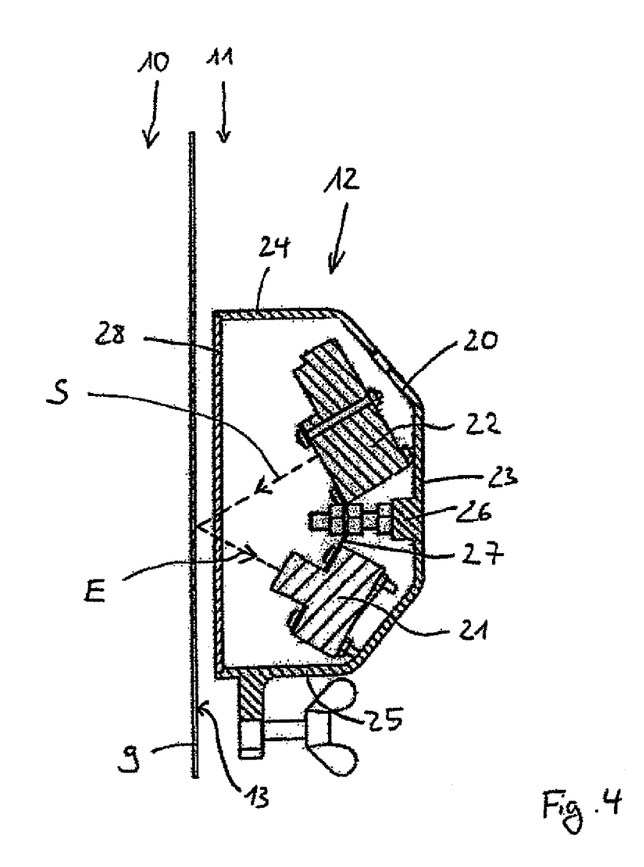
FIG. 4 shows a cross sectional view through a sowing heart monitoring apparatus according to an embodiment of the present invention and its position relative to a sowing disk of the sowing heart, as shown in FIG. 1.

The sowing heart monitoring apparatus 12 consists of a housing 20 which can be attached to the sowing heart 3' for accommodating a line camera 21 and a radiation source 22. The housing 20 protects the line camera 21 and the radiation source 22 against fouling and other ambient effects. The housing 20 seals the inner cavity of the housing 20 both against dirt and moisture as well as against light at least on one back side 23 facing away from the sowing disc 9 and on one top side 24 and one bottom side 25 of the housing.

Within the housing 20 on the back side 23 there is a reinforcement 26 which projects into the interior for mounting of the line camera and of the radiation source 22. The mounting takes place via an angle sheet 27 on whose one end the line camera 21 is attached at an angle. On the other opposite end of the angle sheet 27 the radiation source 22 is attached at an angle. The radiation source 22 comprises especially one LED and emits light as electromagnetic waves in one direction of radiation S. After passage through a transmitting disc 28, optionally with minor refraction, the light is incident largely on a reflection surface 13 of the sowing disc 9 and is reflected there. The sowing heart monitoring apparatus 12 is located on the seed side 11 so that the reflection surface 13 is also located on the seed side 11 of the sowing disc 9. The radiation source as one possible embodiment can be a LED which emits red light.

The radiation source 22 is angled by means of the angle sheet 27 such that the electromagnetic waves which have been emitted by the radiation source 22 in the radiation direction S detect the sowing holes 15 of the sowing disc 9 on the reflection surface 13. The electromagnetic waves are reflected by the reflection surface 13 in the direction of the line camera 21 which is aligned at the same angle to the radiation source 22 relative to the reflection surface 13, in one detection direction E. The electromagnetic waves are reflected by the reflecting surface 13 differently than from the sowing holes 15. Depending on whether no seed grains, one seed grain or two seed grains 16 adhere to the detected sowing hole 15, for each case the effect on the reflected electromagnetic waves is different. The reflected electromagnetic waves are detected by the line camera 21 and by an evaluation unit which is not shown and which sits either in the line camera 21 or which can be located connected via a line to the line camera 21 for example in a central computer in the cab of the tractor. The evaluation unit evaluates the signals which have been acquired by the line camera 21 based on the different electromagnetic waves. In this case it can be advantageous to detect only contrasts since the smooth metallic sowing disc 9 as an ideal reflection surface 13 has a contrast value which is very different from the sowing holes 15 and seed grains 16.

Figure 5A:
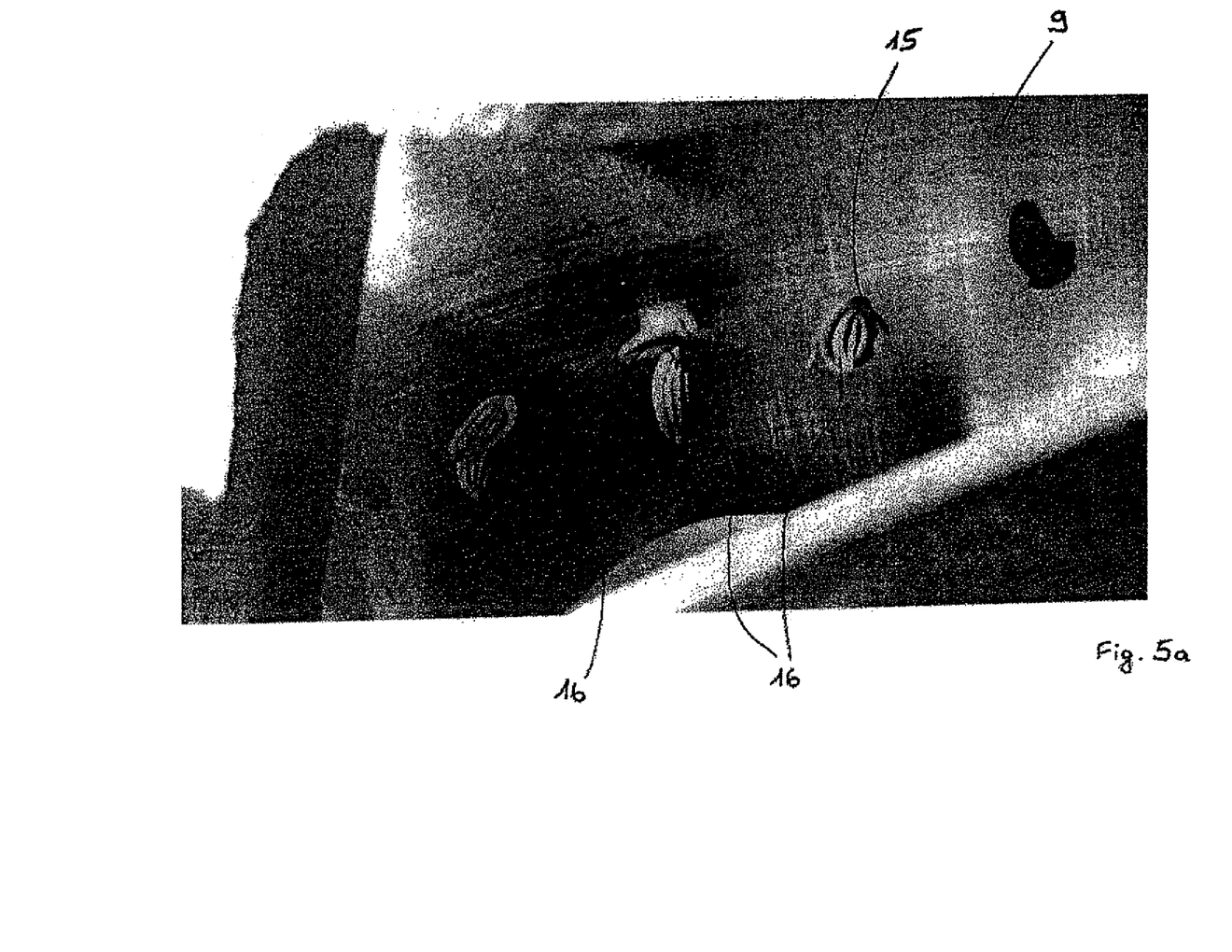
FIG. 5a shows a recording of a section of the sowing disc and FIG. 5b shows an image recorded by the sowing heart monitoring apparatus.

FIG. 5a shows a recording of seed grains 16 (here parsley seeds) which adhere to the sowing holes 15 of the sowing disc 9. On the sowing hole 15 which is imaged in the middle two seed grains 16 are held, while on the sowing hole 15 which is located to the right of it one seed grain 16 adheres.

Figure 5B:
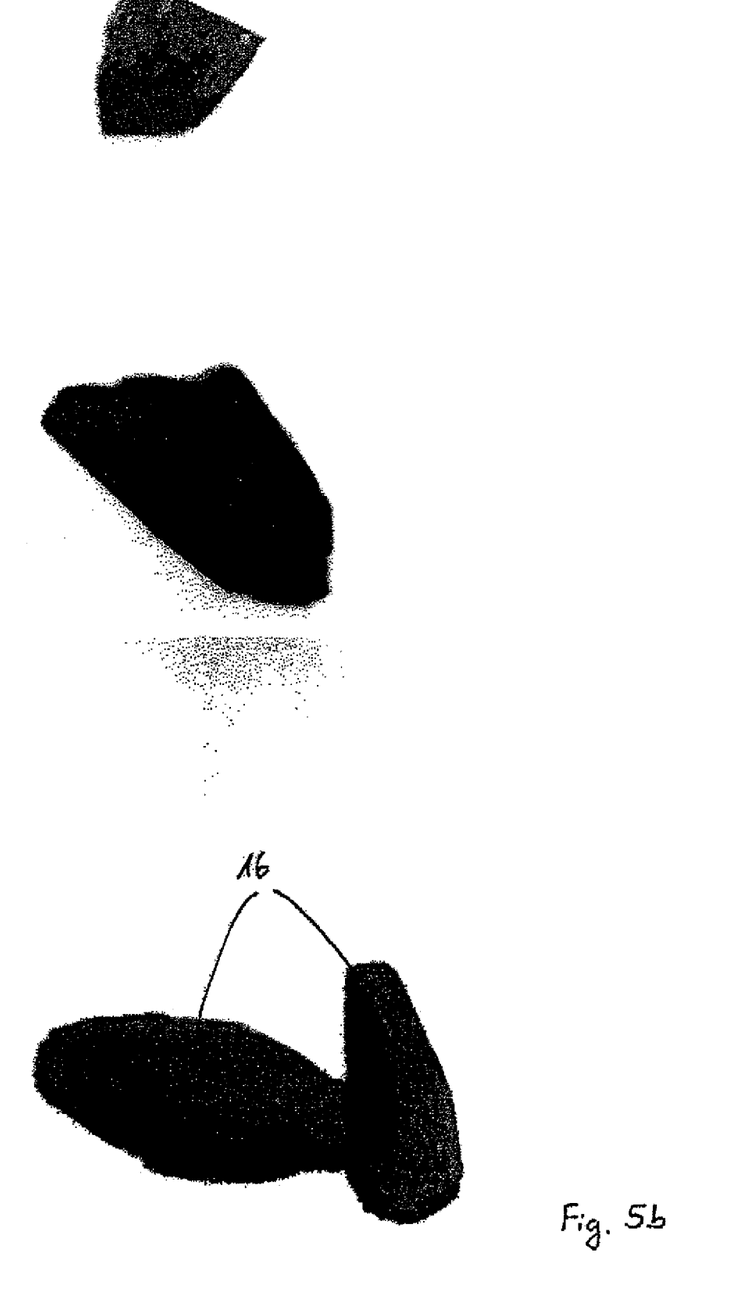

The line camera 21 acquires an image which is shown in FIG. 5b, which consists only of contrast values and which can be easily evaluated by the evaluation unit. During evaluation, based on the contrast values it is distinguished between the sowing disc and the seed grains or the sowing hole, and the area of the dark objects (i.e. seed grains or sowing hole) is determined. For two seed grains 16 compared to one seed grain 16 the area is much larger and the latter is in turn much larger than the area of a sowing hole 15 which is not occupied. In addition to the evaluation of the area, also other features such as for example the eccentricity or compactness can be used to distinguish between the sowing hole, one seed grain, and two seed grains.

The line camera 21 continuously measures the contrast values of one section of the sowing disc 9 which is rotating past in the region of the sowing holes 15 and for each sowing hole 15 there is a rise of the contrast values, depending on whether the sowing hole 15 is not occupied, is occupied by one seed grain or is occupied by two seed grains 16.

The evaluation unit in the region of each sowing hole 15 forms one analytical entity for the statistical evaluation. Since each seed grain (see FIG. 5a) can have a different alignment relative to the line camera 21 and the seed grains 16 can be different, for the cases of adherence of one seed grain 16 or two seed grains 16 there is a more or less large deviation (depending on the seed) in the acquired values. To the extent no seed grain 16 is adhering to the detected sowing hole 15, the deviation is very small since the fabrication precision of the sowing holes 15 is relatively high. A noteworthy deviation arises in any case by adhering dirt.

In the statistical evaluation of the areas or other features of the detected objects it is advantageous to leave extreme values ignored. Then the average of the analytical entity can be formed. Depending on the different seed-stored values and determined standard deviations, boundary values can be stored in the evaluation unit which correspond especially to twice to three times the standard deviation. In this way the values which have been determined for each basic entity can be assigned by the evaluation unit to one of the three cases no occupancy, one seed grain 16 or two seed grains 16.

The disc 28 is one part of the housing 20 and it seals the interior of the housing 20 relative to the vicinity. The disc 28 is aligned parallel to the reflection surface 13 and is formed preferably from plexiglass. The line camera 21 can be adjusted such that with increasing fouling or other change of the properties of the disc 28 the exposure time of the line camera 21 or the radiation output emitted from the light source is automatically increased. To the extent the integration time or radiation output cannot be further increased, an error message can be output so that the disk 28 can be cleaned or replaced.

According to one preferred embodiment, the radiation source 22 emits red light in the radiation direction S, especially by providing a red LED. The electromagnetic waves which have been reflected on the reflection surface 13 are filtered by a filter which is attached to the line camera 21 so that in spite of the housing 20, outside light which may be penetrating via the disc 28 has the smallest possible effect on the evaluation.

The sowing monitoring apparatus is attached to half 3.2 via fasteners 29 (here wing nuts).

REFERENCE NUMBER LIST

1 sowing set
2 arm
3, 3' sowing heart
3.1 half
3.2 half
4 tank
4d cover
4k channel
5 sowing share
6 travelling wheels
7 ploughshare point
8 working space
9 sowing disc
10 pressure side
11 seed side
12 sowing heart monitoring apparatus
13 reflection surface
15 sowing holes
16 seed/seed grains
20 housing
21 line camera
22 radiation source
23 back side
24 top side
25 bottom side
26 reinforcement
27 angle sheet
28 disc
29 fastener
S radiation direction
E detection direction Having described the invention, the following is claimed:

1. A sowing heart monitoring apparatus for connection to a sowing heart and for monitoring of the sowing heart, said sowing heart monitoring apparatus comprising:
    a line camera with one detection direction,
    a housing attachable to the sowing heart for accommodating the line camera, and
    a radiation source for generating electromagnetic waves detected by the line camera, said radiation source having one radiation direction,
    wherein the electromagnetic waves generated by the radiation source are detected by the line camera after reflection on a reflection surface of a rotating sowing disc of the sowing heart, said electromagnetic waves detected by the line camera evaluated by an evaluation unit, and
    wherein the detection direction and the radiation direction are arranged at the same angle relative to the reflection surface of the rotating sowing disc.

2. The sowing heart monitoring apparatus as claimed in claim 1, wherein the housing is sealed relative to an environment outside the housing.

3. The sowing heart monitoring apparatus as claimed in claim 2, wherein the housing is sealed onto the sowing heart.

4. The sowing heart monitoring apparatus as claimed in claim 1, wherein said sowing heart monitoring apparatus includes a disk located between the line camera and the reflection surface, said disk transmitting the electromagnetic waves.

5. The sowing heart monitoring apparatus as claimed in claim 4, wherein said disk seals the housing relative to environment outside the housing.

6. The sowing heart monitoring apparatus as claimed in claim 1, wherein the line camera detects a movement of sowing holes of the rotating sowing disc with seed grains.

7. The sowing heart monitoring apparatus as claimed in claim 1, wherein the radiation source is a light source.

8. The sowing heart monitoring apparatus as claimed in claim 7, wherein said light source is an LED.

9. The sowing heart monitoring apparatus as claimed in claim 8, wherein said LED is a red LED.

10. The sowing heart monitoring apparatus as claimed in claim 1, wherein said sowing heart monitoring apparatus further comprises:
    a filter selective for the electromagnetic waves, said filter located between the reflection surface and the line camera.

11. The sowing heart monitoring apparatus as claimed in claim 10, wherein said filter is located on the line camera.

12. The sowing heart monitoring apparatus as claimed in claim 1, wherein said detection direction and said radiation direction are dictated by fasteners of the housing on the sowing heart and the arrangement of the line camera and the radiation source in the housing.

13. The sowing heart monitoring apparatus as claimed in claim 1, wherein said angle is dictated by fasteners of the housing on the sowing heart and the arrangement of the line camera and the radiation source in the housing.

14. A sowing heart for a single-seed drill, said sowing heart comprising:
   a sowing disc which can be rotated in one direction of rotation with a plurality of sowing holes which are distributed concentrically to the sowing disc, for adherence of individual seed grains along at least one concentric sowing hole circle and
   a sowing heart monitoring apparatus comprising:
      a line camera with one detection direction,
      a housing attachable to the sowing heart for accommodating the line camera, and
      a radiation source for generating electromagnetic waves detected by the line camera, said radiation source having one radiation direction,
      wherein the electromagnetic waves generated by the radiation source are detected by the line camera after reflection on one reflection surface of a rotating sowing disc of the sowing heart, said electromagnetic waves detected by the line camera evaluated by an evaluation unit, and
      wherein the detection direction and the radiation direction are arranged at the same angle relative to the reflection surface of the rotating sowing disc.

15. The sowing heart as claimed in claim 14, in which the sowing heart monitoring apparatus is attached to a peripheral edge of the sowing heart for fixing of the sowing heart on the single-seed drill.

16. The sowing heart as claimed in claim 15, wherein said sowing heart monitoring apparatus is attached to the peripheral edge of the sowing heart by fasteners.

17. A single-seed drill with a sowing heart comprising:
   a sowing disc which can be rotated in one direction of rotation with a plurality of sowing holes which are distributed concentrically to the sowing disc, for adherence of individual seed grains along at least one concentric sowing hole circle and
   a sowing heart monitoring apparatus comprising:
      a line camera with one detection direction,
      a housing attachable to the sowing heart for accommodating the line camera, and
      a radiation source for generating electromagnetic waves detected by the line camera, said radiation source having a radiation direction,
      wherein the electromagnetic waves generated by the radiation source are detected by the line camera after reflection on one reflection surface of a rotating sowing disc of the sowing heart, said electromagnetic waves detected by the line camera evaluated by an evaluation unit, and
      wherein the detection direction and the radiation direction are arranged at the same angle relative to the reflection surface of the rotating sowing disc.

\* \* \* \* \*